United States Patent
Aggarwal et al.

(10) Patent No.: US 8,769,003 B2
(45) Date of Patent: Jul. 1, 2014

(54) METHOD FOR PROXIMITY DETERMINATION BETWEEN MOBILE PEERS WHILE MAINTAINING PRIVACY

(75) Inventors: Ashutosh Aggarwal, San Diego, CA (US); Marcello V. Lioy, Mercer Island, WA (US); Nitin Khanna, San Francisco, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 127 days.

(21) Appl. No.: 13/467,806

(22) Filed: May 9, 2012

(65) Prior Publication Data

US 2013/0304898 A1 Nov. 14, 2013

(51) Int. Cl.
*G06F 15/16* (2006.01)
*G06F 12/00* (2006.01)

(52) U.S. Cl.
USPC ........................................................ 709/203

(58) Field of Classification Search
CPC . H04L 67/18; H04L 63/0492; H04L 65/1006; H04L 65/1069; H04L 65/1073; H04L 65/1083; H04L 65/1089; H04L 65/403; H04L 65/4061; H04L 67/306; H04L 2209/603; H04L 2463/101; H04L 63/0428

USPC .................. 709/203, 217–218, 223–229, 250
See application file for complete search history.

(56) References Cited

U.S. PATENT DOCUMENTS

| | | | | |
|---|---|---|---|---|
| 8,150,416 | B2 * | 4/2012 | Ribaudo et al. | 455/456.1 |
| 8,526,977 | B2 * | 9/2013 | Pearson et al. | 455/461 |
| 2007/0087682 | A1 * | 4/2007 | DaCosta | 455/3.01 |
| 2008/0126186 | A1 * | 5/2008 | Ullah | 705/10 |
| 2008/0220760 | A1 * | 9/2008 | Ullah | 455/420 |
| 2010/0159842 | A1 | 6/2010 | Fukagawa et al. | |
| 2011/0302019 | A1 * | 12/2011 | Proctor et al. | 705/14.27 |
| 2012/0094666 | A1 * | 4/2012 | Awoniyi et al. | 455/435.1 |
| 2012/0323685 | A1 * | 12/2012 | Ullah | 705/14.53 |
| 2013/0165138 | A1 * | 6/2013 | Bahl et al. | 455/456.1 |
| 2013/0275199 | A1 * | 10/2013 | Proctor et al. | 705/14.27 |

* cited by examiner

*Primary Examiner* — Zarni Maung
(74) *Attorney, Agent, or Firm* — Neugeboren O'Dowd PC

(57) ABSTRACT

This disclosure describes systems, methods, and apparatus for determining proximity between networked devices without requiring those devices to share location information either because of privacy or because such information cannot be obtained. To do this, access points for a plurality of networked devices are compared, and those devices detecting, or detected by, the same access points are deemed proximal to each other. Software, or features of software, can be initiated on those networked devices that are proximal to other networked devices and the proximal networked devices can be given information enabling them to identify and communicate with each other.

22 Claims, 10 Drawing Sheets

METHOD FOR PROXIMITY DETERMINATION BETWEEN MOBILE PEERS WHILE MAINTAINING PRIVACY

FIELD OF THE DISCLOSURE

The present disclosure relates generally to networked devices. In particular, but not by way of limitation, the present disclosure relates to systems, methods and apparatuses for determining a proximity between networked devices.

BACKGROUND

Numerous software applications (e.g., peer-to-peer applications) seek to initiate or take action when two wireless mobile devices (e.g., smartphones) are proximal to each other (i.e., within a preset distance). For instance, an online social game (e.g., FARMVILLE) can enable a player to use new powers when at least 3 'friends' or 'followers' (e.g., FACEBOOK friends or followers on TWITTER) are simultaneously within a twenty foot radius of the player. Marketing applications may present advertisements or promotions to passersby of brick-and-mortar store. A dating application (e.g., SKOUT and ARE YOU INTERESTED) may enable users to view profiles of and communicate with other users who are nearby (e.g., in the same baseball stadium). Traditionally, proximity between communication devices has been determined by comparing locations of various devices where the locations are provided by the communication devices (e.g., via GPS).

However, privacy concerns and reception issues may make it undesirable or difficult to share or even know location information. Often, users do not wish to share location information, and even if they do, there are many instances where location information may not be known (e.g., limited GPS reception inside buildings), or may be too slow to acquire (e.g., a GPS signal can sometimes take a number of seconds, or even minutes to acquire).

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a method of determining networked device proximity without sharing location information. The method can include receiving, at a server system, from the first and second networked devices, identifications of an access point that both the first and second networked devices detect. The method can further include determining, at a proximity component of the server system for comparing the received identifications, that each of the first and second networked devices detect the access point. The method can also transmit to at least one of the first or second networked devices, at the server system, a proximity indicator indicating that the first and second networked devices are proximal.

Other embodiments of the disclosure may also be characterized as a server system including a server system and a proximity component. The server system configured to receive, from a first and second networked devices, identifications of an access point that both the first and second networked devices detect. The server system can be further configured to transmit a proximity indicator to at least one of the first or second networked devices, where the proximity indicator indicates that the first and second networked devices are proximal. The proximity component can be configured to compare the received identifications and determined that each of the first and second networked devices detect the access point.

Other embodiments of the disclosure can be characterized as a networked device comprising means for accomplishing the following: identifying one or more other networked devices detected by the networked device; transmitting to a server system, identification of the one or more other networked devices detected by the networked device; and receiving an identification of a proximal networked device from the server system, where the proximal networked device detects one or more of the one or more other networked devices and is therefore proximal to the networked device.

Further embodiments of the disclosure can be characterized as a non-transitory, tangible computer readable storage medium, encoded with processor readable instructions to perform a method for determining proximity between at least first and second mobile devices without knowledge of their location. The method can include receiving, at a server system, from the first and second networked devices, identifications of an access point that both the first and second networked devices detect. Additionally, the method can include determining, at a proximity component of the server system for comparing the received identifications, that each of the first and second networked devices detect the access point. The method can also include transmitting to at least one of the first or second networked devices, at the server system, a proximity indicator indicating that the first and second networked devices are proximal.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

The word "access point" as used herein means any device that communicates with another device. WIFI routers, LAN routers, BLUETOOTH access points, BLUETOOTH-enabled devices (e.g., hand free headsets, speakers, glasses, music players, smartphones, tablet computers, laptop computer, netbooks, ultrabooks), cellular access points, and default gateways are some non-limiting examples of access points. Access points can provide access to a network such as a LAN, cellular network, or the Internet, but are not required to provide access to a network. In some cases, they are merely 'access points' to their own internal logic and functions (e.g., a BLUETOOTH hands-free headset).

For the purposes of this disclosure, a networked device can include mobile devices, communication devices, wireless devices, and wired devices, all configured to communicate with a network or with at least one other networked device. A networked device need not be primarily configured for communication, but rather merely able to communicate with other networked devices. While this disclosure often uses communication devices (e.g., smartphones and cellular phones) in the examples and illustrations, one of skill in the art will recognize that such descriptions are equally applicable to all types of networked devices and that the embodiments herein disclosed are not limited to communication devices.

Figure 1:
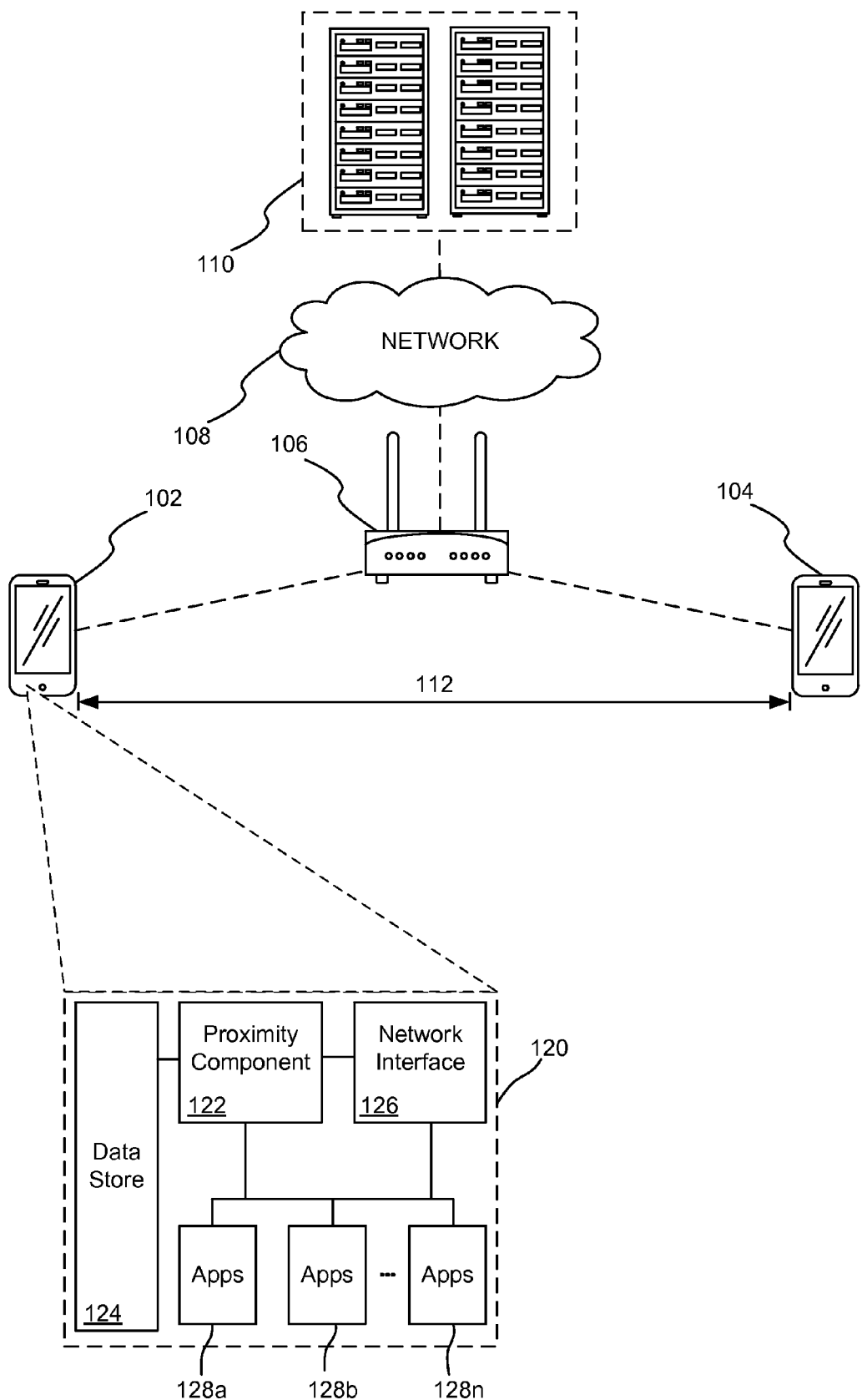
FIG. 1 helps illustrate the problem of determining proximity between networked devices without sharing location information, and also provides a framework within which a solution can be discussed.

FIG. 1 helps illustrate the problem of determining proximity between networked devices without sharing location information, and also provides a framework within which a solution can be discussed. A first communication device 102 (e.g., smartphone, laptop, netbook, tablet computer, ultrabook, etc.) desires to know if another networked device, such as a second communication device 104, is within a certain distance or is proximal—in other words, the first communication device 102 seeks to know the proximity 112 between itself and the second communication device 104. While both communication devices 102, 104 are able to communicate via the access point 106 (e.g., a WIFI router), neither communication device 102, 104 shares location information either due to privacy concerns or lack of knowledge regarding current location (e.g., no GPS signal).

Because of the aforementioned privacy and reception challenges, there is a need for systems, methods, and apparatus that can determine proximity between networked devices without extracting or accessing location information from the networked devices. This need can be met by the systems, methods, and apparatus of the present disclosure. In particular, a list of access points that two or more networked devices are within range of can be analyzed to identify those networked devices that are within range of the same access points. Those networked devices can then be notified of their 'proximity' to each other and software can be initiated on the networked device, or features of software can be initiated, based on the proximity. Alternatively, a server-based application can initiate software or features of software based on the proximity.

The communication devices 102, 104 can each include at least some or all of the components 120 (only illustrated for the first communication device 102). The components 120 can include, a proximity component 122, a data store 124, a network interface 126, and a plurality of applications or applications 128a, 128b, . . . , 128n (e.g., games, social media games, massive multiplayer online games, social networking applications, dating software, marketing applications, or communication applications, to name a few non-limiting examples). The components 120 can be interconnected in any of a variety of fashions well known to those of skill in the art. The depiction of the components 120 is logical only (e.g., the proximity component 122 could be combined with one of the applications 128a, 128b, . . . , 128n) and is not intended to be an actual hardware or architecture diagram. As discussed further herein, each of the components 120 may be further separated into constituent components, or the components 120 may be integrated to such an extent that each of the components 120 may not be separately recognizable in actual implementation. For example, the depicted division of the proximity component 122 and applications 128a, 128b, . . . , 128n into constituent components is exemplary only to facilitate a description of the functions that the proximity component 122 has in the exemplary embodiment. In practice the functions of the proximity component 122 and one or more of the applications 128a, 128b, . . . , 128n could be carried out via a single application, for example. Also, in actual implementation, there may be separate hardware, firmware, and/or software components that do not exactly correspond to the functional division described with reference to FIG. 1. Other components such as the data store 124 and the network interface 126 can also have combined functionality with each other or with others of the components 120.

Each communication device 102, 104 can scan or monitor for access points (e.g., a WIFI router or cellular tower) and store an identifier of any detected access points. For instance, the first and second communication devices 102 and 104 can monitor wireless signals and determine that they are within range of access point 106 as determined by the proximity component 122 of either communication device 102, 104. The proximity component 122 can obtain an identifier of the access point 106 (e.g., a BSS-ID or SSID), and optionally store the identifier in the data store 124. Each of the first and second communication devices 102, 104 therefore has a list of nearby or detected access points, where the term 'nearby' varies depending on a variety of factors such as access point signal strength and objects or environmental effects that diminish the signal range. However, roughly speaking, if an access point is detected by a device, then it is nearby. In FIG. 1, if the first and second communication devices 102, 104, can detect the access point 106, then they are within twice the maximum range of the access point 106. In some embodiments, the access points can scan for networked devices and store identifiers of proximal networked devices.

The proximity component 122 can pass the identifiers, via a network interface 126, to a server system 110 via the access point 106 and the network 108. The server system 110 can then compare the identifiers provided by each of the communication devices 102, 104 and determine if the two communication devices 102, 104 are within range to at least one common access point. In the illustrated embodiment, the server system 110 receives identifiers from both communication devices 102, 104 identifying one or more access points including the access point 106. Since the access point 106 is commonly detected by both communication devices 102, 104, the server system 110 considers these communication devices 102, 104 proximal—within twice a maximum range of the common access point 106. If more than one access point is common to both communication devices 102, 104, then the communication devices 102, 104 can be deemed even closer to each other. While this method only provides limited accuracy, the rough proximity determinations are sufficient for many purposes where privacy is an issue or location information is difficult to obtain.

Once the server system 110 determines that both communication devices 102, 104 are proximal, the server system 110 can initiate an action on the proximal communication devices 102, 104. A variety of actions are envisioned, such as initiation of an application or feature of an application, and initiation of communication between the communication devices 102, 104, to name two non-limiting examples. For instance, the server system 110 may pass instructions to each communication device 102, 104 via the network interface 126 telling the proximity component 122 to initiate one of a plurality of applications 128*a*, 128*b*, . . . , 128*n* on each communication device 102, 104. As another example, users of a dating application may be allowed to instant message each other when they are deemed 'proximal' to each other, for instance when their smartphones are detecting at least one same or common access point.

The server system 110 may also pass an identification to the proximity component 122 that the proximity component 122 can use to initiate communication between the two communication devices 102, 104 or to initiate one of the applications 128*a*, 128*b*, . . . , 128*n* directed to communicating with the other communication device. The server system 110 may also provide an identification to the communication devices 102, 104 notifying them of other communication devices that are proximal. The instructions or an identification can be stored in the data store 124.

In some embodiments, the server system 110 will only consider the communication devices 102, 104 proximal when they identify at least one common access point, and they are either running, or are installed with, a certain common application 128*a*, 128*b*, . . . , 128*n*.

While this system does not provide an exact determination of proximity 112 between communication devices 102, 104, it can provide a maximum distance that can separate the two communication devices 102, 104, which is sufficient for many situations. For instance, where the access point 106 is a BLUETOOTH-enabled device or access point, the two communication devices 102, 104 are probably within a few dozen feet of each other since many BLUETOOTH-enabled devices and access points have limited range. If the access point 106 uses WIFI, then the proximity 112 is likely less than a couple hundred feet. In the case of a cellular access point, the proximity 112 could be much larger (e.g., miles), but still within some useful radius.

In some embodiments, even coarser proximity 112 determinations can be made where communication devices 102, 104 share a common subnet or default gateway, and identification of a common subnet or default gateway can indicate a proximity between communication devices 102, 104. For instance, a default gateway can cover entire buildings or even whole commercial complexes. However, even such coarse proximity 112 determinations can be highly valuable where there is a lack of location information or an inability to share location information.

Additionally, many applications 128*a*, 128*b*, . . . , 128*n* look for a proximity between networked devices, and thus merely knowing a maximum proximity 112 between the communication devices 102, 104 can be sufficient to enable the proximity-based functionality of those applications.

While FIG. 1 has been described such that an end result of proximity between the communication devices 102, 104 is an initiation of one of the applications 128*a*, 128*b*, . . . , 128*n*, or initiation of a feature of one of these applications, 128*a*, 128*b*, . . . , 128*n*, in some cases the proximity component 122 effectuates a function in response to close proximity between the communication devices 102, 104.

The proximity component 122, the network interface 126, the data store 124, and the applications 128*a*, 128*b*, . . . , 128*n* can be implemented as software, hardware, firmware, or a combination of the above. For instance, the proximity component 122 can be implemented as an application running on one or more processors of the communication devices 102, 104 and accessing a memory of the communication devices 102, 104. Alternatively, the proximity component 122 can be embodied in an ASIC. These are just two examples showing the plethora of embodiments in which the proximity component 122 and others of the components 120 can be implemented.

The proximity component 122 can operate in the background (e.g., a service or agent) or can be an active operation. In other embodiments, the proximity component 122 can be user-activated. In some embodiments, the proximity component 122 is a thin application (e.g., a small piece of code) that requires little device resources to operate. The proximity component 122 may operate in the application or service layer of the software stack. In some instances, the functionality of the proximity component 122 can be embodied by one or more operations of the method described with reference to FIG. 9.

Figure 2:
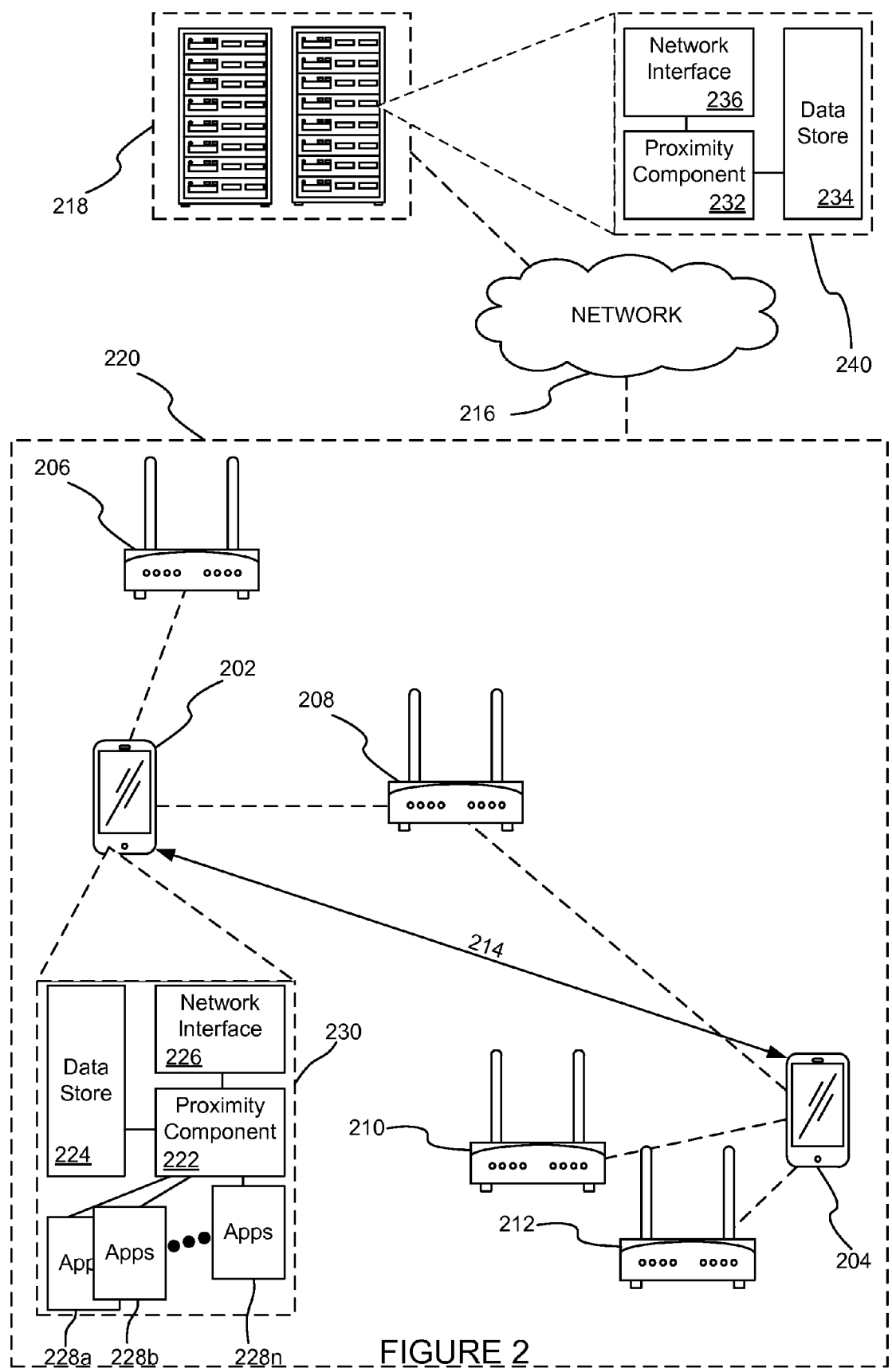
FIG. 2 illustrates another system in which embodiments of the present disclosure can be implemented.

In practice, networked devices are often within range of multiple access points. For instance, as illustrated in FIG. 2, a first communication device 202 is within range of two access points: a first wireless access point (WAP) 206 and a second WAP 208. A second communication device 204 is within range of three access points: the second WAP 208, a third WAP 210, and a fourth WAP 212. The common access point is the second WAP 208. Since the communication devices 202, 204 can both detect the second WAP 208, they are proximal and this proximity indicates that a proximity 214 between them is no greater than twice a maximum range of the second WAP 208.

The functionality described with reference to FIG. 2 can be carried out via one or more of components 230 of the communication devices 202, 204, one or more of components 240 of a server system 218 (comprising one or more local or remotely distributed servers), or these functions can be distributed between the components 230 and the components 240. The components 230 can include a proximity component 222, a network interface 226, a data store 224, and a plurality of applications 228*a*, 228*b*, . . . , 228*n* (e.g., games, social media games, massive multiplayer online games, social networking applications, dating software, marketing applications, or communication applications, to name a few non-limiting examples). The components 240 can include a proximity component 232, a network interface 236, and a data store 234.

In one embodiment, the components 240 of the server system 218 can determine whether the first and second communication devices 202, 204 are proximal. Alternatively, or in addition to determining proximity, the components 240 can determine whether the first and second communication devices 202, 204 are within the proximity 214 from each other. In another embodiment, the proximity component 232 of the first communication device can determine whether the first and second communication devices 202, 204 are proximal. In some cases, the proximity component 232 can also determine the proximity 214 of the first to the second communication devices 202, 204.

The depiction of the components 230 and 240 is logical only and is not intended to be an actual hardware diagram. As discussed further herein, each component of the components 230 and 240 may be further separated into constituent components, or the components 230 and 240 may be integrated to such an extent that each of the components 230 and 240 may not be separately recognizable in actual implementation. The components 230 and 240 can further operate as isolated hardware, software, and/or firmware components, or as one or more unified hardware, software, and/or firmware components. For instance, the proximity component 222 or 232 could be a processor including an on-chip data store 224 or 234 in the form of cache. On the other hand, the proximity component 222 or 232 could be a software module operating on a processor where the software module accesses and stores information in a data store 224 or 234. Many other variations are also possible. For instance, in one embodiment, the proximity component 232 can perform various logic and control functions such as analyzing and determining proximity between networked devices. In such an embodiment, the proximity component 222 can store identifications of detected access points, provide them to the server system 218 (which can be a remote server system), receive indicators from the server system 218 indicating other proximal networked devices, and store these indicators in the data store 224. Also, in actual implementation, there may be separate hardware, firmware, and/or software components that do not exactly correspond to the functional division described with reference to FIG. 2.

The first, second, third, and fourth WAPs 206, 208, 210, 212, which for simplicity can be referred to as a WAP system 220, can be in communication with the server system 218 via the network 216 (e.g., the Internet, a cellular network combined with the Internet, a cellular network, or a LAN to name a few non-limiting examples) and via a network interface 236 of the server system 218. In particular, the WAP system 220 can provide the server system 218 with information describing the networked devices that are in communication with or have detected access points, and information describing the access points. For instance, in the illustrated embodiment, the WAP system 220 can indicate to the server system 218, via the network interface 236, that the first communication device 202 is detecting the first and second WAPs 206, 208, and that the second communication device 204 is detecting the second, third, and fourth WAPs 208, 210, 212. This data can be stored in a data store 234 of the server system 218.

In an alternative embodiment, each communication device 202, 204 can pass identifiers of detected access points (or lists of detected access points) to the server system 218. These identifiers can be stored in the data store 234. WIFI access points can be identified by BSS-ID and/or SSID. The BSS-ID is an address assigned to the hardware acting as the access point while the SSID is an address assigned to a logical aspect of the access point. The BSS-ID can be a MAC address in one embodiment. The BSS-ID can be a preferred form of access point identification because each BSS-ID is a globally-unique value.

The communication devices 202, 204 can pass these identifiers to the server system 218 via the network 216 and in particular via various means of transmission from a networked device (e.g., a network interface, a network port, an antenna, a network connection, etc.). In another embodiment, the WAP system 220 provides identifications of communication devices 202, 204 that are within range of an access point as well as identifications of the corresponding access points, while the communication devices 202, 204 also pass identifications of the access points that they are within range of, to the server system 218.

The communication devices 202, 204 can also store the identifiers and lists in a data store 224 of each communication device 202, 204. The proximity component 222 (e.g., a processor or other controller or logic module or control application) can manage the data store 224. The server system 218 can also store the identifiers and lists in a data store 234 of the server system 218. The proximity component 232 of the server can manage the data store 234.

Once the server system 218 has received information describing what networked devices are detecting what access points, the proximity component 232 of the server system 218 can determine which networked devices are detecting the same access points. The proximity component 232 can then categorize or group those networked devices that are proximal to each other (detecting the same access points).

The server system 218 can return information describing these groups to the communication devices 202, 204, where the proximity component 222 in each communication device 202, 204 can use this information to initiate software applications (e.g., applications 228a, 228b, . . . , 228n) that reside on the communication devices 202, 204 or features of these software applications. The proximity component 222 in each communication device 202, 204 can also use this information to initiate any other process, application, or service. In other embodiments, the proximity component 232 of the server system 218 can initiate software applications, features of software applications, processes, or services on the one or more communication devices 202, 204. Software applications may include games, social media games, massive multiplayer online games, social networking applications, social media applications, dating software, marketing applications, or communication applications, to name a few non-limiting examples.

The proximity component 232 of the server system 218 can also use the information describing the groups to initiate a software application (or service or process), such as one of the applications 228a, 228b, . . . , 228n, or a feature of a software application. The software application may be a web-based or device-based application that automatically initiates on the first and second communication devices 202, 204 when they are proximal to each other, or may prompt the users of the first and second communication devices 202, 204 to allow the software to initiate. A feature of a software application may include opening of a new level within a game or the opening of an instant messaging user interface as part of a running program, to name two non-limiting examples. For instance, where a user is browsing FACEBOOK or reading TWEETS, and a 'friend' or 'follower' comes within 100 feet (or any proximity set by the application), FACEBOOK or TWITTER may open an instant messaging dialogue box that both users can use to communicate with each other. Or a FACEBOOK user may see a list of 'friends' with icons next to each friend indicating whether or not that friend is nearby or proximal. Such proximity indications can also indicate a rough distance. For instance, a black dot next to a friend's name or profile picture can indicate that they are not proximal; a red dot may indicate that they are within the same city; a green dot may indicate that they are within the same building; and a blinking green dot may indicate that they are within the same room. These examples are merely for illustration and do not limit the scope of possible applications that can be embodied by the applications 228a, 228b, . . . , 228n.

In one embodiment, the proximity component 232 will not take action (e.g., initiating a program, initiate a feature of a program, etc.) unless there is proximity between two networked devices, and both networked devices include a certain program, feature of a program, process, or service. For instance, the first and second communication devices 202, 204 may be proximal, but if only a first communication device 202 has a certain social gaming application installed that requests proximity between networked devices to initiate, then the proximity component 222 or 232 will not initiate the gaming application. Only, where both communication devices 202, 204 have the gaming application and are proximal will the gaming application run or initiate a feature of the application. In some cases, the proximity determination may not even be made unless at least two networked devices have a specified application or a specified application is running on both networked devices. In other words, in some embodiments, the proximity approximation may only be performed amongst networked devices that have or are running a specified application, process, or service.

In a particular embodiment, the proximity component 232 can be aware that the first communication device 202 is looking for another networked device having a particular service. The proximity component 232 may then look at all networked devices that are proximal to the first communication device 202 and see if this service is running on any proximal networked devices. If so, then action can be taken relative to these two networked devices (e.g., initiation of a common process). In some embodiments, the proximity component 232 may look for other common resources besides applications, services, and processes. For instance, the proximity component 232 may look for common identifiers between proximal networked devices, where an identifier can identify an application, process, or service of a networked device.

In cases where a networked device detects different types of access points (e.g., cellular and WIFI), the proximity component 232 of the server system 218 or the proximity component 222 of the communication device 202 or 204, can use an algorithm or hierarchy to preferentially use some types of access points over others. For instance, where two cellular and two WIFI access points are all detected by the communication devices 202, 204, the cellular access points may be ignored or given a lesser weight when determining proximity. This is because WIFI access points are generally shorter ranged than cellular access points and thus generally provide more accurate proximity approximations.

Along these lines, networks or access point types can be preferred in the following order: BLUETOOTH, WIFI (e.g., BSS-ID), cellular, subnet, and default gateway. In other words, access point types can be preferred in an order of range, from shortest to longest. For instance, two networked devices may access the same two access points, where one access point operates on WIFI and the other is a subnet. Because of a preference for the WIFI access point, the fact that the networked devices both detect the same subnet access point may be ignored, and instead the proximity determination may be made solely with the WIFI access point.

A weighted average can also be used to determine proximity when different types of access points are used. In some embodiments, proximity can be determined based on different access point types and then a weighted average as determined based on the different access point types can be determined. Greater weight can be given to preferred access point types in the following order: BLUETOOTH, WIFI (e.g., BSS-ID), cellular, subnet, and default gateway. Alternatively, rather than giving lower weight to less preferred access point types, they can be excluded from the proximity determination. Weights can be based on observed access point signal strength, channel noise, and transmission power required, to name a few non-limiting examples.

In some embodiments, the access point protocol of a given type of access point may be considered (e.g., 802.11g versus 802.11n) by the proximity component 222 or the proximity components 232. Since some networked devices or access points may not be backwards compatible, this consideration can avoid false negatives where one networked device can communicate with an access point but another cannot merely because one networked device uses an older access point protocol. For instance, where a first communication device 202 detects two access points via 802.11n, and a second communication device 204 detects the same access points but only operates according to 802.11g, and the access points are incapable of operating on 802.11g, the second communication device 204 will not appear to be close to the first communication device 202 since the second communication device 202 will be unable to communicate with the access points. However, if both communication devices 202, 204 make the server system 218 aware of their WIFI protocols, and the server system 218 is also aware of the access point protocols, then the server system 218 can decide that access points operating on 802.11n should not be used in comparisons because this could result in false negatives. Instead, only access points able to operate on 802.11g and older protocols will be used in comparisons to determine proximity. This is just one example of excluding an access point due to access point protocol compatibility. In another embodiment, proximity may be determined separately for different access point protocols (e.g., one determination for 802.11g and one for 802.11n).

A proximity 214 between the two communication devices 202, 204, if they share a common access point, is twice the maximum range of the common access point (e.g., where the two communication devices 202, 204 are arranged on opposite sides of the access point and the access point is equidistant from both communication devices 202, 204). However, in most cases, the communication devices 202, 204 will not be exactly opposite from each other with the access point bisecting the proximity 214 between them, and therefore, the proximity 214 will typically be less than twice a maximum range of the access point.

The proximity 214 will further be shortened by atmospheric and structural elements that reduce the range of an access point. For instance, where the second WAP 208 resides within a building with cinderblock walls, the range of the second WAP 208 will be greatly reduced, and thus the proximity 214 is likely to be less than if the second WAP 208 were located in an open park.

Along these lines, in an embodiment, the location of an access point can be used to enhance an accuracy of the proximity determination (e.g., knowledge of the proximity 214). For instance, where it is known that the second WAP 208 is inside a building, a decrease in its maximum range can be approximated and used to determine the proximity 214. Similarly, the access point range can be approximated as a function of direction (e.g., access point range can be described by vectors). In other words, one can approximate a range profile for a access point that takes into account directional differences in an access point's range. For instance, it may be known that a concrete wall is to the North of an access point, and open space extends beyond the range of the WAP to the South. In this case, the maximum range of the access point to the North can be estimated to be less than that to the South. Also, electromagnetic transmission modeling can be used to estimate a maximum range based on the materials and structure that the access point signal must travel through in a given direction. At the same time, because different directions can lead to decreased access point range, the proximity 214 may be more accurately approximated if one of the communication devices 202, 204 is located in such a direction relative to the access point.

The range of access points, and thus the accuracy of the proximity 214 approximation depends on the access point type and protocol within an access point type. For instance, different WIFI routers have different ranges as do different BLUETOOTH devices. As another example, WIFI protocol 802.11n typically has a longer range than 802.11g. As such, a BLUTOOTH access point will provide a more accurate approximation of proximity 214 than a cellular access point, and 802.11g will typically provide a more accurate proximity 214 approximation than 802.11n, for instance.

Further, position rather than mere proximity may also be determined where the location of one or more access points is known. For instance, in FIG. 3, a communication device 302 is within range of two nearby access points: a first WAP 304 and a second WAP 306. The maximum theoretical range of the first WAP 304 is a range 310. The maximum theoretical range of the second WAP 306 is a range 312. If the locations of the first and second WAPs 304, 306 are known, then the position of the communication device 302 must be within the area 314 where the range 310 of the first WAP 304 and the range 312 of the second WAP 306 overlap. When three or more access points are used, the area 314 can be even smaller, and thus knowledge of the communication device 302 position can be even more accurate. Even if the position of only a single access point is known, if that access point is detected by the communication device 302, then the communication device 302 has to be within a maximum range of the access point.

Figure 3:
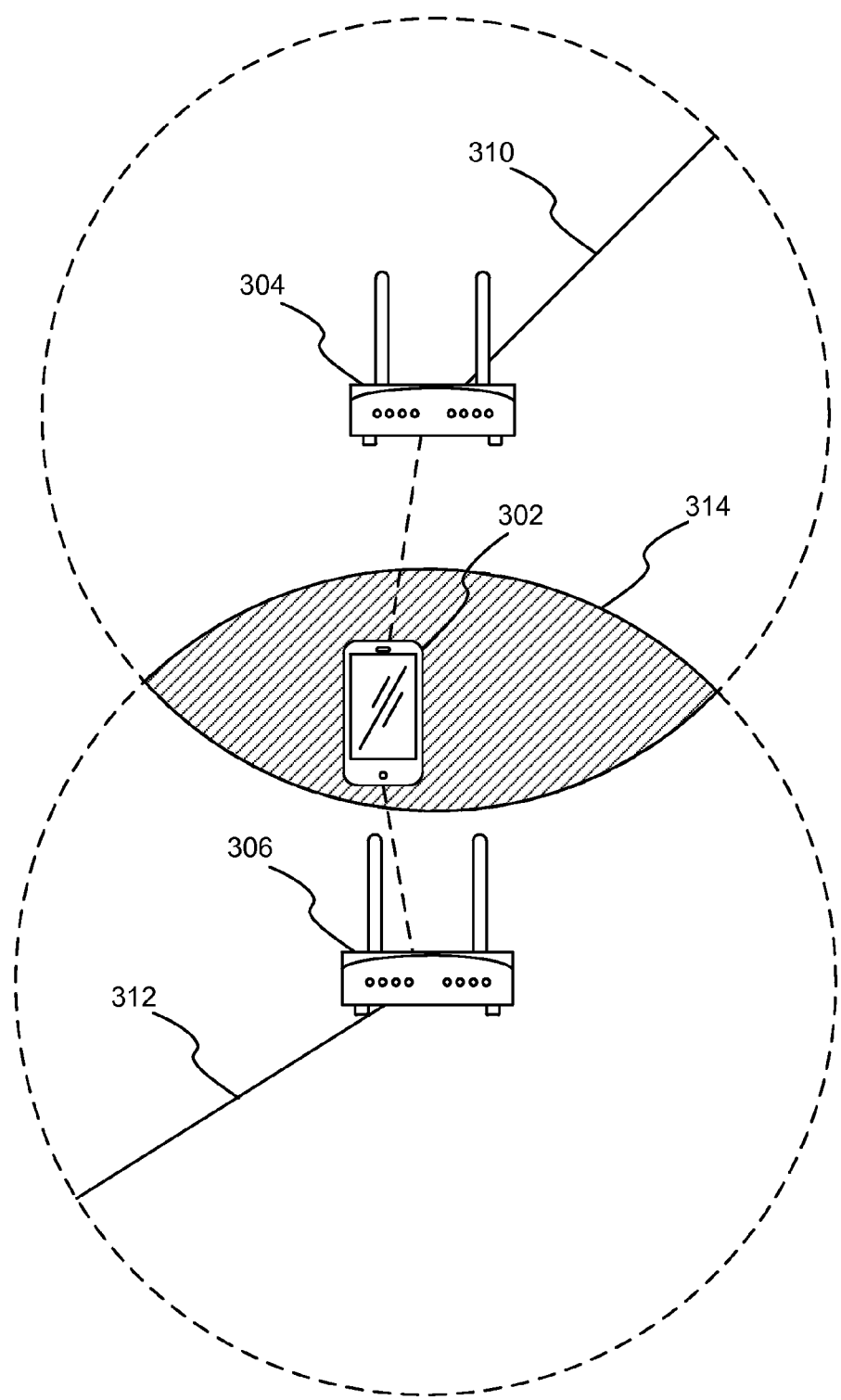
FIG. 3 illustrates how the location of a networked device can be approximated using two or more access points.
Figure 4:
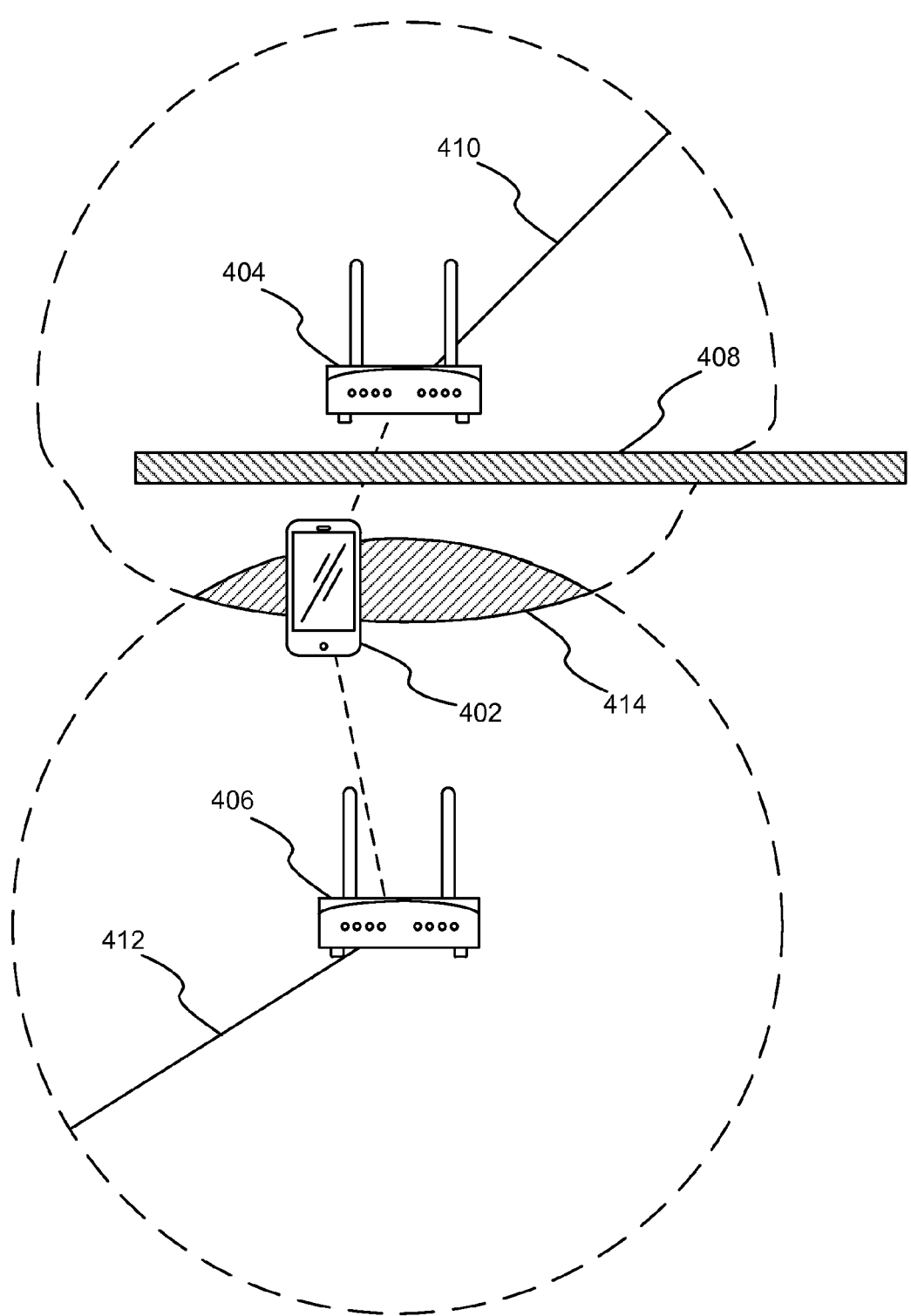
FIG. 4 illustrates how the location of a networked device can be approximated using two or more access points and knowledge of nearby objects and/or structures.

Combining the method illustrated in FIG. 3 and a directionally-dependent range can produce further advantages. FIG. 4 illustrates a communication device 402, a first WAP 404, a second WAP 406, and a concrete wall 408 separating the first WAP 404 from the communication device 402. The locations of the first and second WAPs 404, 406 and the concrete wall 408 are known. A directionally-variant range 410 can be modeled for the first WAP 404 based on its surroundings, including the concrete wall 408. The directionally-variant range 410 is likely to be diminished by the concrete wall 408 in a directionally-dependent fashion. Again, the area 414 representing the overlap between the directionally-variant range 410 of the first WAP 404 and the range 412 of the second WAP 406 gives the area 414 in which the location of the communication device 402 is likely to be.

This same method can be expanded to include modeling of walls, objects, atmospheric effects, landscape features, and dynamic features (e.g., elevators, large masses of walking people, or vehicles, to name a few). Modeling can be performed in both two and three dimensions, although here only a two-dimensional example is illustrated.

Figure 5:
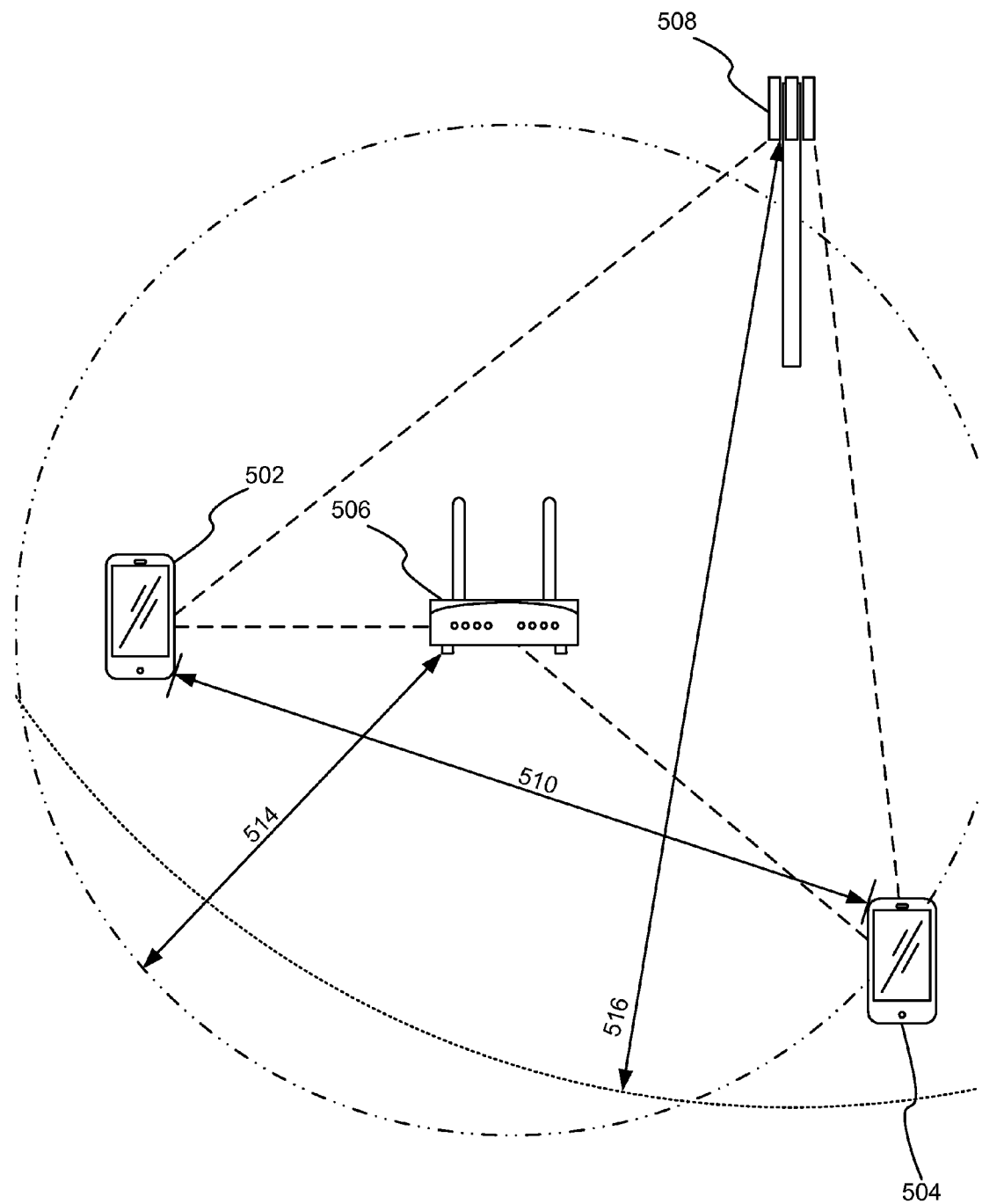
FIG. 5 illustrates one example of how different types of access points having different ranges can provide different levels of accuracy for determining proximity.

FIG. 5 illustrates one example of how different types of access points having different ranges can provide different levels of accuracy for determining proximity. Here first and second communication devices 502, 504 detect a WIFI WAP 506 or a cellular WAP 508. The cellular WAP 508 has a longer range 516 than the range 514 of the WIFI WAP 506. This longer range 516 provides less accurate knowledge regarding the proximity 510 between the communication devices 502, 504, since proximity is roughly equal to all values less than twice a maximum range of an access point. Since both communication devices 502, 504 can detect both the WIFI WAP 506 and the cellular WAP 508, the proximity 510 is less than twice a maximum range of either the WIFI or cellular WAPs 506, 508, whichever has a shorter maximum range. Since the range 516 of the cellular WAP 508 is longer than that of the WIFI WAP 506, the proximity 510 will be approximated as longer (less accurate) if the cellular WAP 508 is used. Accordingly, proximity is more accurately determined using access points having shorter range (e.g., BLUETOOTH and WIFI, to name two).

Similarly, signal strength can be used to improve the accuracy of a proximity or distance 214 determination. The proximity component 222 in each communication device 202, 204 can measure signal strength of detected access points and provide this to the server system 218. Alternatively, the first, second, third, and fourth WAPs 206, 208, 210, 212 can measure the strength of the communication device 202, 204 signals and provide this to the server system 218. Either way, the signal strength can then be used to approximate a distance between each of the first and second communication devices 202, 204 and each of the first, second, third, and fourth WAPs 206, 208, 210, 212. Consequently, locations of the communication devices 202, 204 are more accurately known and thus also the proximity. The use of signal strength can be used alone or in combination with knowledge of access point locations in order to more accurately determine the proximity.

In one embodiment, distance from an access point can be determined from time stamp information. A time stamp can be attached to packets that are passed between an access point and a networked device, and the time stamp can be compared to a time when those packets are received. The difference may be used to calculate a distance between an access point and a networked device based on a known speed of transmitted waves and atmospheric effects on propagation speed.

Most signals from the communication devices 202, 204 eventually pass through a default gateway en route to the Internet. Default gateways typically take the form of a router and act as gatekeepers to the Internet for one or more networked devices within a local geographic area (e.g., a house, building, or commercial complex). Thus, proximity can be based on which communication devices 202, 204 commonly detect the same default gateway.

Figure 6:
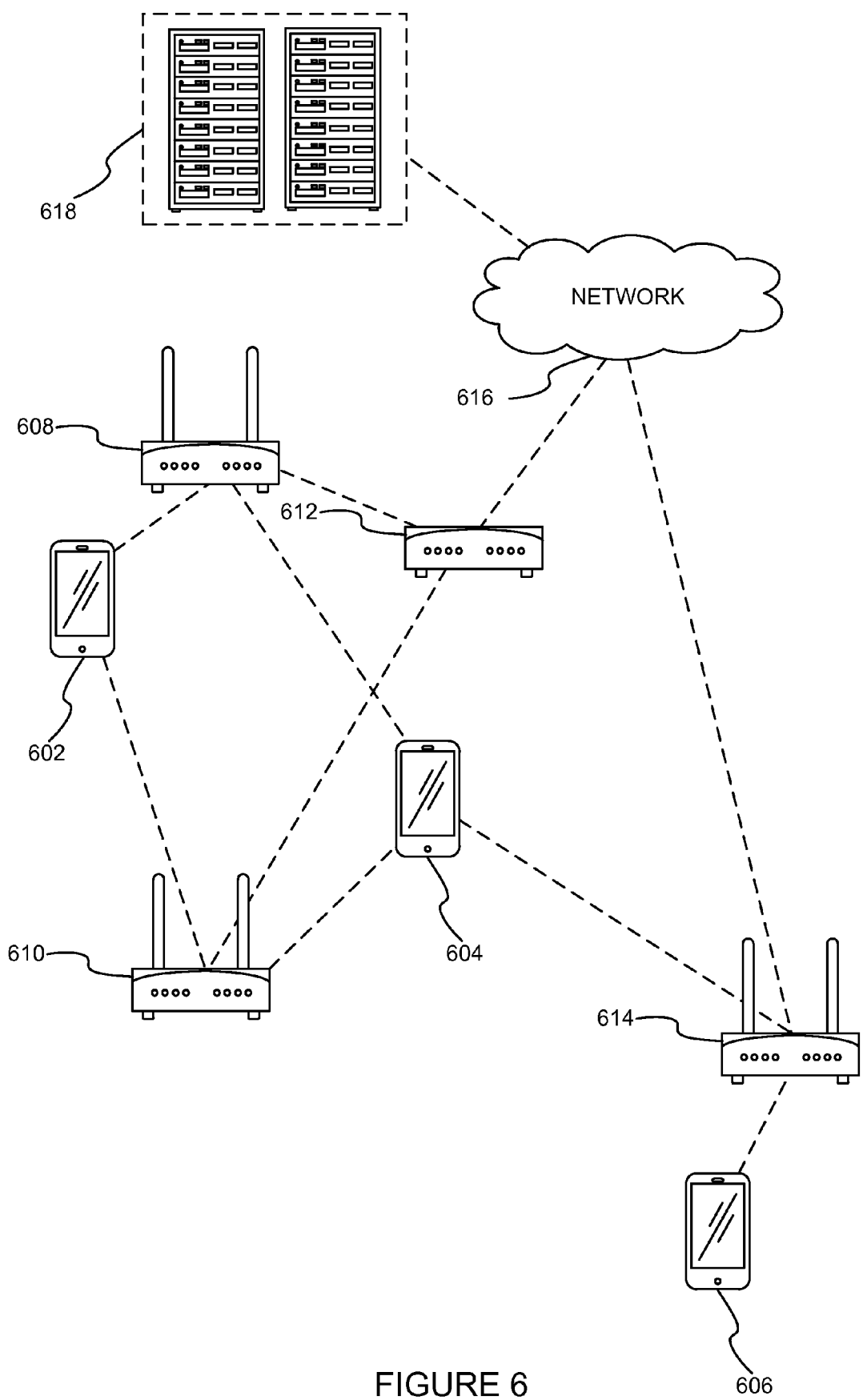
FIG. 6 illustrates an exemplary system where default gateways can be used to determine proximity between networked devices.

FIG. 6 illustrates an exemplary system where default gateways can be used to determine proximity between networked devices. A first default gateway 612 and a second default gateway 614 route packets to and from a network 616 (e.g., Internet, cellular, a combination of the two, or a LAN). The network 616 further passes packets between a server system 618 and the default gateways 612, 614, among other varied tasks. The first and second WAPs 608, 610 can detect the first default gateway 612. First and second communication devices 602, 604 can detect the first and second WAPs 608, 610 and the default gateway 612. In other words, the first and second communication devices 602, 604 are within range of the first and second WAPs 608, 610. The first and second communication devices 602, 604 can also access the network 616 via the first and/or second WAPs 608, 610, assuming proper configuration and authorization.

The second default gateway 614 can communicate with the second communication device 604 and also with a third communication device 606, both of which are within the second default gateway's 614 range. The second communication device 604 is thus able to access the network 616 via either the first or second default gateway 612, 614.

As seen, the first default gateway 612 communicates via wired or wireless means with the first and second WAPs 608, 610. In this particular configuration it does not directly communicate with the communication devices 602, 604. The second default gateway 614 on the other hand, is a default gateway and an access point since it directly communicates with both the second and third communication devices 604, 606 and the network 616. Default gateways can thus either communicate directly with networked devices (e.g., 614 and 606) or can communicate directly with wireless routers or access points (e.g., 612 and 608 or 612 and 610), or both.

When determining proximity between communication devices 602, 604, 606, common access points can be a basis for a first determination. The first and second communication devices 602, 604 can both access the first and second WAPs 608, 610, while the third communication device 606 can only access the second default gateway 614 (also an access point). Therefore, the first and second communication devices 602, 604 are likely closer together since they share one more common access point than do the second and third communication devices 604, 606. The first communication device 602 is probably even further from the third communication device 606 since these two networked devices do not share any common access points.

At the same time, the first and second default gateways 612, 614 can be used to determine proximity. The first and second communication devices 602, 604 access the network 616 via the first default gateway 612, while the second and third communication devices 604, 606 access the network 616 via the second default gateway 614. So, the first and second communication devices 602, 604 are likely proximal since they share the first default gateway. Similarly, the second and third communication devices 604, 606 are likely close to each other since they share the second default gateway 614. Admittedly, since default gateways typically cover a larger geographical area than access points, the default gateways do not provide as accurate a determination of proximity between networked devices as do the access points.

While proximity determinations have been described that use either commonly-accessible access points or commonly accessible default gateways, in other embodiments, both commonly-accessible access points and commonly-accessible default gateways can be used.

A variety of applications (e.g., 128a, 128b, ..., 128n, 228a, 228b, ..., 228n) can make use of the proximity information derived via the system illustrated in FIG. 2. New levels, characters, or abilities can be unlocked in games when certain other users, or certain numbers of other users, are proximate to a first user. Social networking applications (e.g., FACEBOOK, TWITTER, LINKEDIN, TAGGED, MEETUP, BADOO) can enable communications (e.g., instant messaging), or access to profiles of other users when they come within a preset distance. Other programs can bring videos, posts, and photos to the forefront of a user's GUI where priority is given to content created by persons proximal to the user (e.g., COLOR). Promotions and ads can be displayed on a user's networked device when he/she comes within a preset distance of a brick-and-mortar store or an event or a concession stand. These are just a few of the plethora of applications that can make use of the proximity information derived via the system illustrated in FIG. 2.

In one embodiment, the proximity component 232 or the proximity component 222 can initiate such programs, or a feature of said programs, when the first and second communication devices 202, 204 are proximal and the proximity 214 is less than or equal to a threshold or preset proximity. So, the first and second communication devices 202, 204 could detect the same access point, and thus be proximal, and yet the program may not initiate because the communication devices 202, 204 are not necessarily within the threshold proximity required by the program. For instance, two networked devices may be proximal in the sense that they both detect the same cellular access point, yet a communication program on both networked devices may only initiate when the two networked devices are within 100 feet of each other. The cellular access point may have a maximum range of three miles, and thus mere proximity as determined by common detection of the same cellular access point does not necessarily mean that the first and second communication devices 202, 204 are within 100 feet of each other. If on the other hand, the first and second communication devices 202, 204 are both detecting the same BLUETOOTH access point, or perhaps a WIFI access point with a range less than 50 feet, then there is assurance that the first and second communication devices 202, 204 were within 100 feet of each other, and thus the communication program can initiate.

Figure 7:
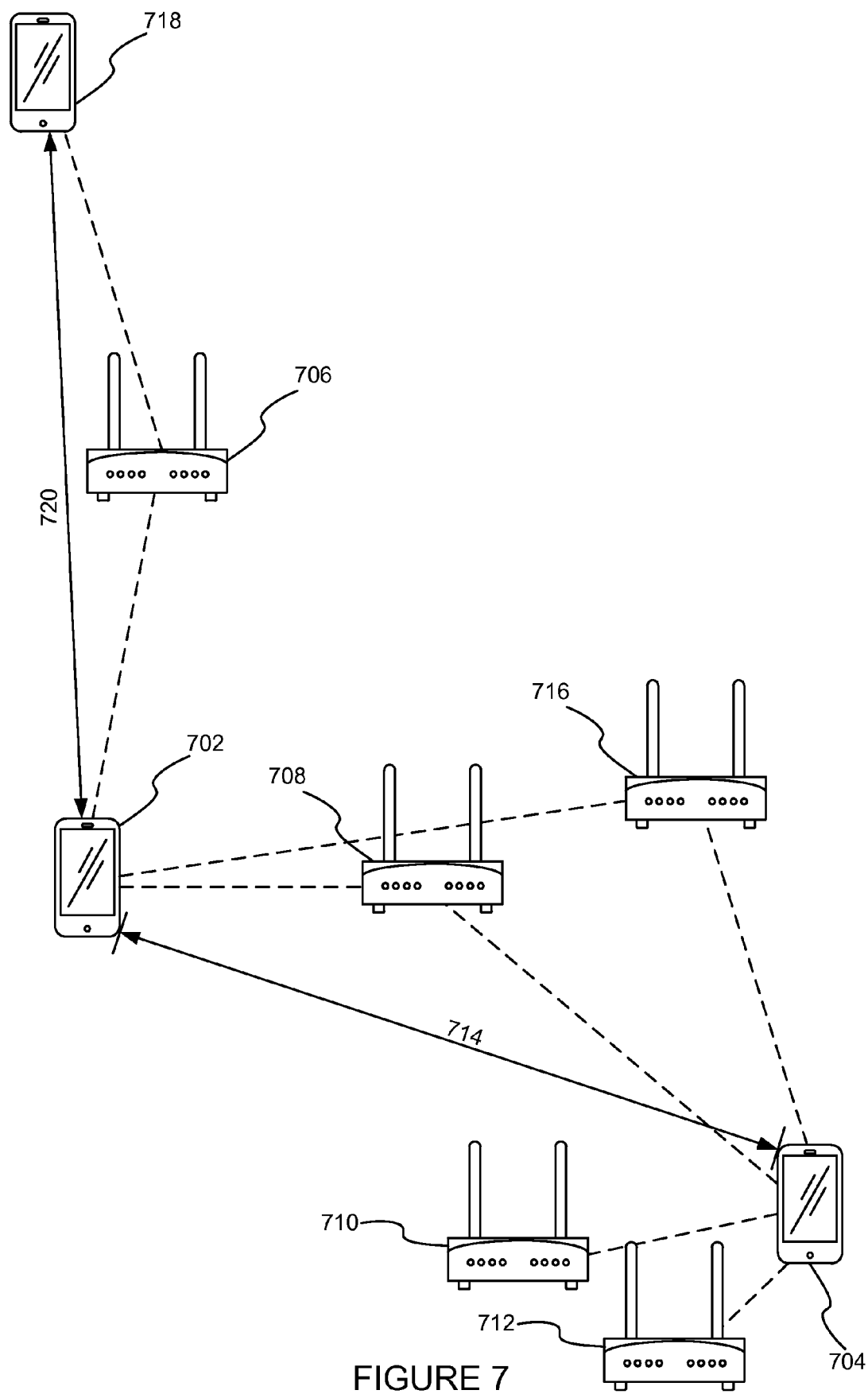
FIG. 7 illustrates a system in which networked devices are detecting two or more common access points.

FIG. 7 illustrates a system in which networked devices are detecting two or more common access points. Unlike previous discussions which determined proximity based on whether two networked devices detected at least one common access point, this discussion deals with situations where common detection of more than one access point can be used to improve the proximity determination. In this illustration there is a first communication device 702, a second communication device 704, and a third communication device 718. The first communication device 702 is in communication with first, second, and third WAPs 706, 708, 716, and the second communication device 704 is in communication with the second, third, fourth, and fifth WAPs 708, 716, 710, 712.

A server system (not illustrated) can determine that the first and second communication devices 702, 704 both detect the second and third WAPs 708, 716. The first communication device 702 and a third communication device 718 commonly detect a first WAP 706. Thus, a proximity 714 between the first and second communication devices 702, 704 is likely shorter than a proximity 720 between the first communication device 702 and the third communication device 718. Along these same lines, if the first and second communication devices 702, 704 share three common access points, and the first and third communication devices 702, 718 only share a single access point, then there is an even greater probability that the first and second communication devices 702, 704 are closer than the first and third communication devices 702, 718. In other words, the greater the number of common access points detected by two networked devices, the closer the proximity between those networked devices.

In one embodiment, the following algorithm can be used to approximate a proximity 714 or 720 between two networked devices: $F=1-c/n$, where the algorithm attempts to minimize a cost function F, and where c is a number of access points common to first and second networked devices, and n is a total number of access points seen by either the first or second networked device. The lower the cost function, F, the greater the proximity. For instance, where the first networked device sees two access points and the second networked device sees three access points, and one of the access points is commonly detected by both networked devices, $F=1-1/4=0.75$. A lower cost function and thus greater proximity would exist where the first and second networked devices had two common access points (e.g., $F=1-2/4=0.5$).

In some embodiments, rather than just counting a number of access points detected by each networked device, the server system (not illustrated) can also assign each access point a weight. Weights can be based on observed access point signal strength, channel noise, transmission protocol, and/or transmission power required, to name a few non-limiting examples.

This disclosure has focused on networked devices detecting access points, but in some embodiments, proximity can be based on detection of other networked devices where networked devices include communication devices (e.g., smartphones, cellular phones, tablet computers, laptop computers, PDAs, netbooks, and ultrabooks to name a few) and access points (e.g., WIFI router, LAN router, BLUETOOTH Internet access point, cell of a cellular network, default gateway, and subnet to name a few). For instance, where a first and second networked device can detect a third networked device, the first and second networked devices can be considered proximal.

Although this disclosure has focused on wireless networked devices such as smartphones, tablet computers, and cellular phones, the scope of the disclosure is not limited to wireless networked devices, and includes any networked device whether wired or wireless (e.g., a desktop computer networked via an Ethernet cable). In other words, rather than wirelessly detecting a network via an access point, a networked device can also detect a network via a wired access point, such as a router having an Ethernet port. When any two or more networked devices detect the same access point, via either wired or wireless means, those two or more networked devices can be considered proximal.

Similarly, the access points need not be wireless, and can therefore be implemented as other types of access points, such as wired access points (e.g., a router with an Ethernet port) or networked devices without a network connection (e.g., a BLUETOOTH hands-free headset or a ZIGBEE home security control system). For instance, and turning back to FIG. 2, the server system 218 could look at commonly-detected access points as well as commonly-detected BLUETOOTH-enabled devices that are within range of the first and second communication devices 202, 204 in order to determine proximity. Even though the BLUETOOTH-enabled device(s) may not have a network 216 connection, the mere fact that both the first and second communication devices 202, 204 are within range of the BLUETOOTH-enabled device(s) indicates that the first and second communication devices 202, 204 are proximal to each other.

In one instance, the systems, methods, and apparatus herein disclosed can operate as long as at least one access point has a network 216 connection (e.g., so that the first and second communication devices 202, 204 can upload lists of identified access points to the server system 218). In some embodiments, one or more of the aforementioned access points can be replaced by a wired local area network (LAN) access point, such as the Ethernet previously described.

Figure 8:
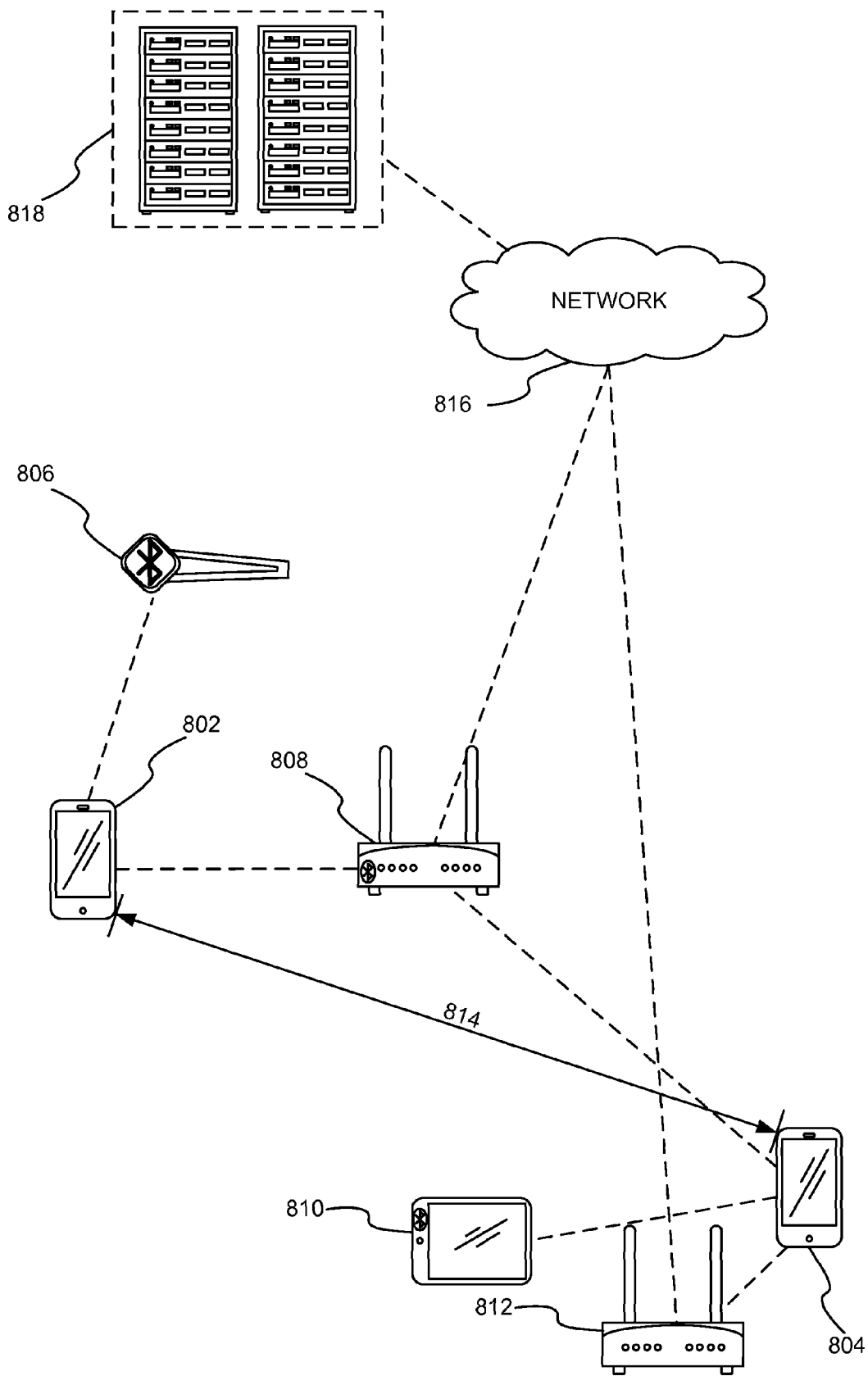
FIG. 8 illustrates an embodiment of proximity determination between networked devices within range of BLUETOOTH access points.

FIG. 8 illustrates an embodiment of proximity determination between networked devices within range of BLUETOOTH access points. In some instances, an access point may not provide access to a network 816, but rather merely to the logic and functions of a device (e.g., a hands-free headset, a smartphone with BLUETOOTH enabled, a compact speaker system, a home security system, a remote control for household utilities like lights and heating, to name a few). Many BLUETOOTH-enabled devices fit this description and some examples are illustrated in FIG. 8. While BLUETOOTH access points can provide connectivity to the network 816, for instance via BLUETOOTH access point 808, other BLUETOOTH access points, such as the BLUETOOTH headset 806 and the BLUETOOTH-enabled tablet computer 810, do not provide network 816 access. Instead, these BLUETOOTH access points merely allow direct device-to-device communications. Nonetheless, they can still be used to determine a proximity 814 between first and second communication devices 802, 804.

The communication devices 802, 804 can transmit an identifier of the access points to which they detect, to the network 816 and to a server system 818. The server system 818 can then compare the identifiers provided by the first and second communication devices 802, 804 and determine if there are any access points commonly-detected by both communication devices 802, 804.

Any BLUETOOTH-enabled device that can communicate with the network 816 can also identify itself to the server system 818 and provide a listing of networked devices that are detected by the BLUETOOTH-enabled device. As an example, BLUETOOTH access point 808 can provide the server system 818 with a list of networked devices including identification of the first and second communication devices 802, 804. Thus, identification of which networked devices can detect a BLUETOOTH access point can be provided from a networked device, or identification of which BLUETOOTH access points can detect a networked device can be provided from a BLUETOOTH access point, or a combination of these.

As discussed previously, a combination of access point types can be used to determine proximity. Here, the first communication device 802 can detect the BLUETOOTH headset 806 and the BLUETOOTH access point 808 (2 access points). The second communication device 804 can detect the BLUETOOTH access point 808, the BLUETOOTH-enabled tablet computer 810, and a WAP 812 (3 access points). The commonly-detectible access point is the BLUETOOTH access point 808.

In the various above-mentioned embodiments, proximity components (e.g., 122, 222, and 232) have been referenced as operating in a server system (e.g., 118, 218, 618, 818) or in a communication device (e.g., 102, 104, 202, 204, 302, 402, 502, 504, 602, 604, 606, 702, 704, 718, 802, 804). However, in some embodiments, both proximity components can simultaneously operate, and their operation can be coordinated.

Figure 9:
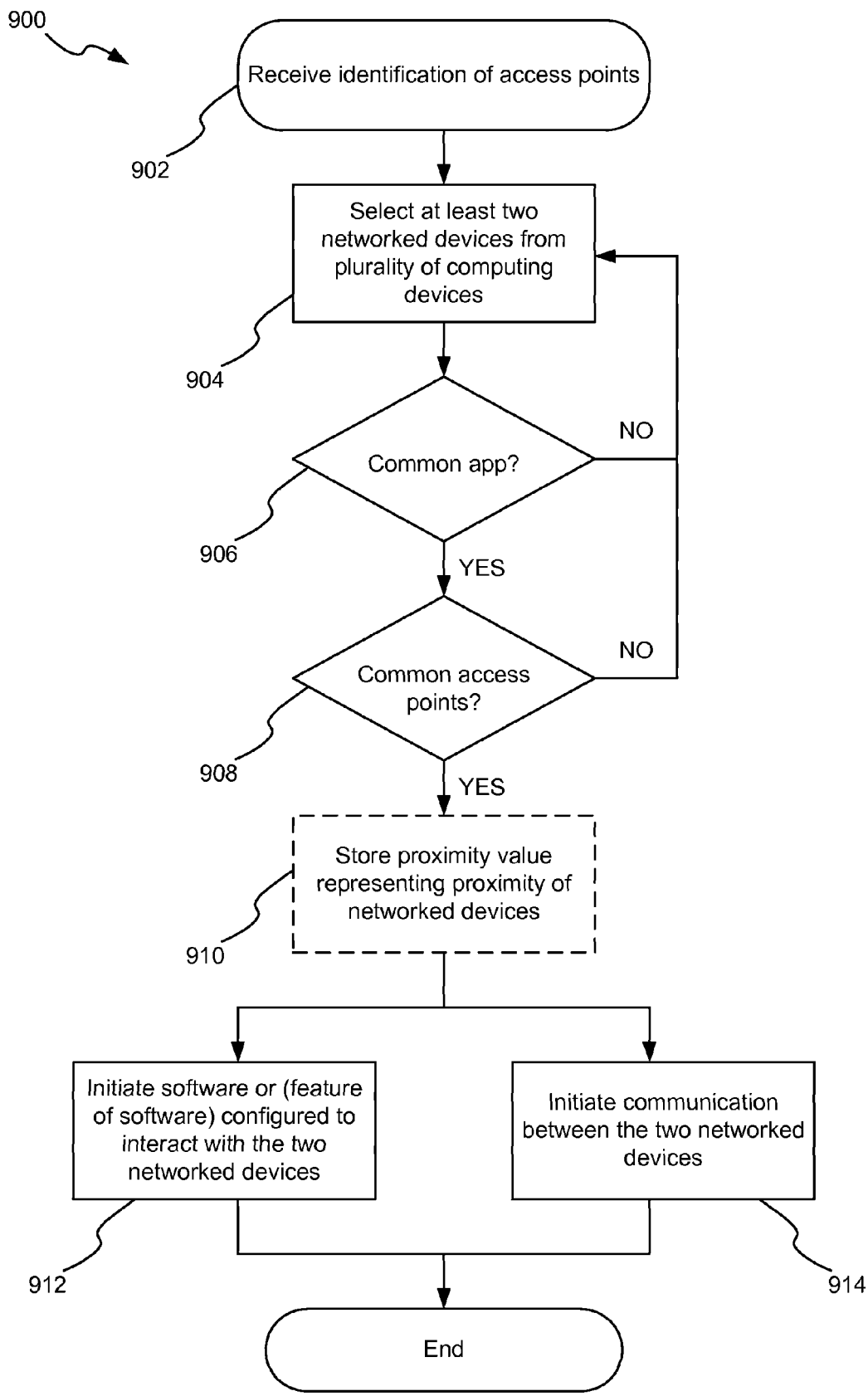
FIG. 9 illustrates one method for approximating proximity between networked devices without sharing location information.

FIG. 9 illustrates a method of determining networked device proximity without sharing location information. The method 900 begins with a server system receiving identification of a plurality of access points including identification of a first access point in a receive identification operation 902. Identification is only possible where a networked device and an access point are close enough for communication to occur. For instance, this distance may include anything inside a maximum range of the access point. Identifications can be provided by one or more networked devices. For instance, a networked device can pass a BSS-ID and/or SSID to the server system, where the BSS-ID and/or SSID is an identifier of an access point. These identifiers are sometimes stored in a data store of networked devices (e.g., data store 124 or 224). In another embodiment, the access points can notify the server system as to what networked devices are accessing the access points and provide identifiers of themselves and the networked devices that are accessing the access points.

The method 900 then selects, via a proximity component of the server system (e.g., proximity component 232), at least two networked devices (e.g., the first and second communication devices 102, 104 or 202, 204) from a plurality of networked devices that provided identifications of access points in a select devices operation 904.

The method 900 then optionally determines if both networked devices have a common application, feature of an application, running process or service, or an identifier. For instance, the method 900 may determine if both networked devices have a common feature of an application that uses or requests proximity (e.g., a dating app or a massive multi-player online game). This can be done in a common app decision 906. If the common app (or process or service) is not shared by the two networked devices, then the method 900 returns to the selection devices operation 904 and selects a new pair of networked devices that can include one of the previously-selected networked devices or two previously unselected networked devices. The common app decision 906 then repeats in a looping fashion until two networked devices are found that share the common app (or process or service). The decision 906 can look for a particular app, not just commonality of any app. The particular app (or process or service) is typically one in which proximity between networked devices is required for initiation of the app or for initiation of a feature of the app.

Once two networked devices are found with the common app, the method 900 moves to a common access points decision 908 where the proximity component of the server system determines whether the two networked devices are proximal to each other. Proximity exists where both networked devices are within a maximum communication range of an access point. One way to determine this is for the proximity component to analyze identifications of access points provided by the networked devices and identify overlaps. Where both networked devices identify the same one or more access points, those networked devices are proximal. If no one access point is commonly-detectable by both networked devices, then the method 900 returns to the selection devices operation 904 and selects a new pair of networked devices (possibly including one of the previously-selected networked devices).

If at least one common access point is found to have been identified by the two networked devices, then the method 900 can store a proximity value in a data store of the server system in an optional store proximity value operation 910. The proximity value can represent that the two networked devices are proximal to each other—separated by no more than twice the maximum range of one access point. This proximity can be determined despite the networked devices not sharing or providing location information with each other or with the server system.

The server system, via the proximity component, can then initiate an action based on this proximity. In some cases, the action includes initiation of software or a feature of software running on the networked devices (e.g., applications 128a, 128b, . . . , 128n, 228a, 228b, . . . 228n) or other processes or services. This can occur via an initiate software operation 912. Alternatively, or concurrently, the proximity component can instruct the networked devices to initiate communication in an initiate communication operation 914.

While this method 900 has been described as linearly operating on two networked devices at a time (or the information that they provide to the server system), one of skill in the art will recognize that this method 900 is equally applicable to operation upon three or more networked devices simultaneously. For instance, all networked devices may periodically upload identifications of detectable access points to the server system, and the server system can identify proximal networked devices based on all of these uploaded identifications simultaneously or in an overlapping or parallel manner rather than comparing identifications from two networked devices at a time. Similarly, if three or more networked devices are proximal, the method 900 can initiate action amongst the three or more networked devices simultaneously. In some embodiments, the method 900 can be carried out by any one or more of the components 230 illustrated in FIG. 2, either alone or in combination.

It should be noted that some embodiments may appear to require access to a common access point in order for there to be proximity between networked devices. However, one of skill in the art will recognize that mere detection of a common access point can indicate proximity, and as such, "access" and "detection" are not synonymous.

Figure 10:
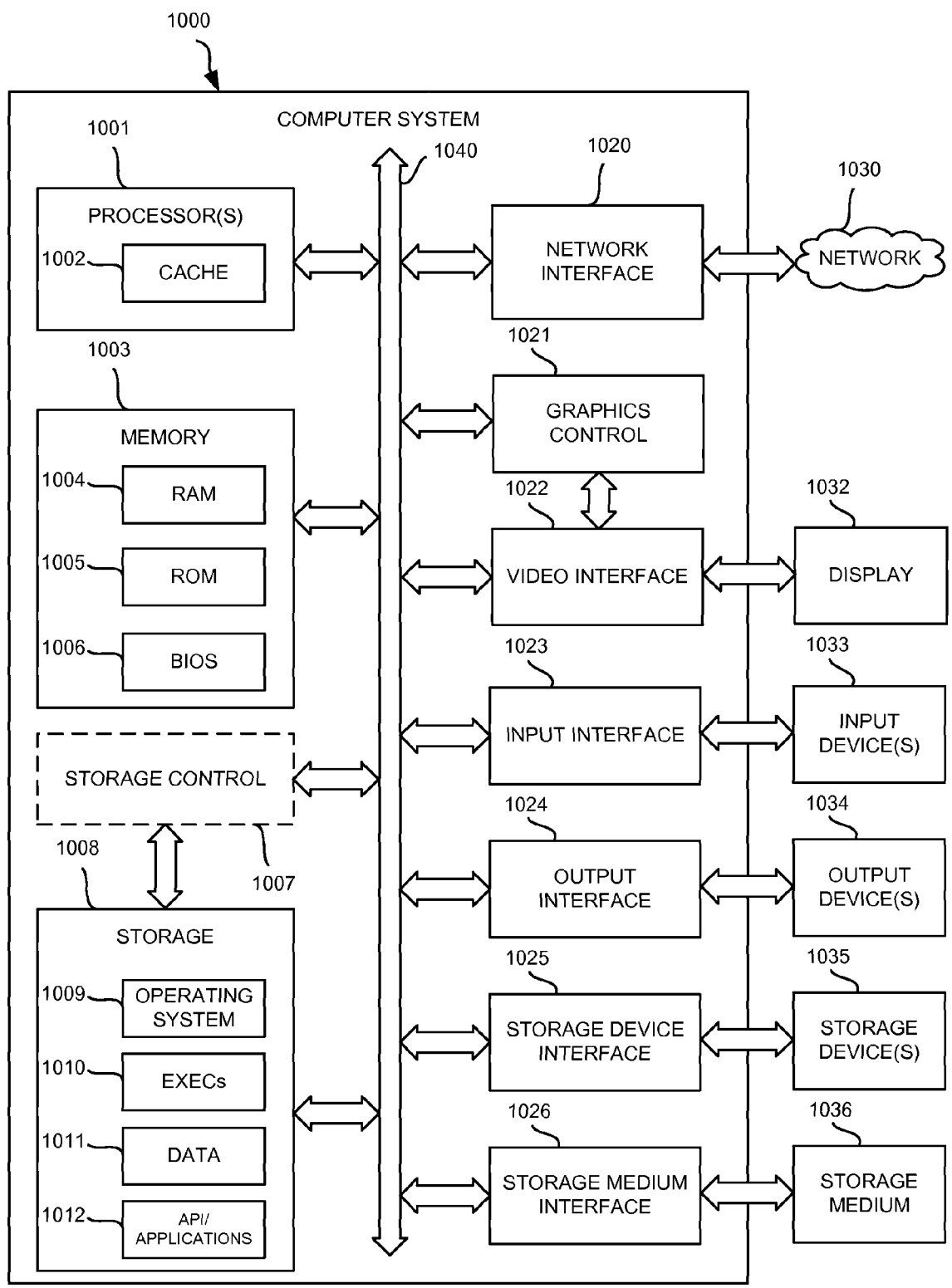
FIG. 10 shows a diagrammatic representation of one embodiment of a machine in the exemplary form of a computer system within which a set of instructions can execute for causing a device to perform or execute any one or more of the aspects and/or methodologies of the present disclosure.

The systems and methods described herein can be implemented in a machine such as a computer system in addition to the specific physical devices described herein. FIG. 10 shows a diagrammatic representation of one embodiment of a machine in the exemplary form of a computer system 1000 within which a set of instructions can execute for causing a device to perform or execute any one or more of the aspects and/or methodologies of the present disclosure. Examples of computer system 1000 include, but are not limited to, the server system 110, 218, 618, 818, the access point 106, the WAPs 206, 208, 210, 212, 304, 306, 404, 406, 506, 508, 608, 610, 612, 614, 706, 708, 710, 712, 716, 806, 808, 810, 812, and the communication devices 102, 104, 202, 204, 302, 402, 502, 504, 602, 604, 606, 702, 704, 718, 802, 804. The components in FIG. 10 are examples only and do not limit the scope of use or functionality of any hardware, software, embedded logic component, or a combination of two or more such components implementing particular embodiments.

Computer system 1000 may include a processor 1001 (e.g., proximity components 122, 222, 232), a memory 1003 (e.g., data store 124, 224, 234), and a storage 1008 (e.g., data store 124, 224, 234) that communicate with each other, and with other components, via a bus 1040. The bus 1040 may also link a display 1032, one or more input devices 1033 (which may, for example, include a keypad, a keyboard, a mouse, a stylus, a radio, a modem, etc.), one or more output devices 1034 (e.g., a radio or modem), one or more storage devices 1035, and various tangible storage media 1036. All of these elements may interface directly or via one or more interfaces or adaptors to the bus 1040. For instance, the various tangible storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1001 (or central processing unit(s) (CPU(s))) optionally contains a cache memory unit 1002 for temporary local storage of instructions, data, or computer addresses. For instance, the cache memory unit 1002 can temporarily store an identification of an access point or an identification of a networked device. The cache memory unit 1002 can also store an access point signal strength or an identification of a proximal networked device. Processor(s) 1001 are configured to assist in execution of computer readable instructions. Computer system 1000 may provide functionality as a result of the processor(s) 1001 executing software embodied in one or more tangible computer-readable storage media, such as memory 1003, storage 1008, storage devices 1035, and/or tangible storage media 1036. The computer-readable media may store software that implements particular embodiments, and processor(s) 1001 may execute the software. The software may include the aforementioned applications 128a, 128b, . . . , 128n, 228a, 228b, . . . , 228n or the aforementioned proximity components 122, 222, 232. Memory 1003 may read the software from one or more other computer-readable media (such as mass storage device 1035 and/or tangible storage media 1036) or from one or more other sources through a suitable interface, such as network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software.

The memory 1003 may include various components (e.g., machine readable media) including, but not limited to, a random access memory component (e.g., RAM 1004) (e.g., a static RAM "SRAM", a dynamic RAM "DRAM, etc.), a read-only component (e.g., ROM 1005), and any combinations thereof. ROM 1005 may act to communicate data and instructions unidirectionally to processor(s) 1001, and RAM 1004 may act to communicate data and instructions bidirectionally with processor(s) 1001. ROM 1005 and RAM 1004 may include any suitable tangible computer-readable media described below. In one example, a basic input/output system 1006 (BIOS), including basic routines that help to transfer information between elements within computer system 1000, such as during start-up, may be stored in the memory 1003. For instance, the memory 1003 can store an identification of an access point or an identification of a networked device. The memory 1003 can also store an access point signal strength or an identification of a proximal networked device. The memory 1003 can also store tangible computer-readable instructions for carrying out the methods illustrated in FIG. 9.

Storage 1008 is connected bidirectionally to processor(s) 1001, optionally through storage control unit 1007. Storage 1008 provides additional data storage capacity and may also include any suitable tangible computer-readable media described herein. Storage 1008 may be used to store operating system 1009, EXECs 1010 (executables), data 1011, API applications 1012 (application programs), and the like. Exemplary data 1011 includes positions of access points, identifications of access points and/or networked devices, distances between networked devices, lists of access points detectable by networked devices, lists of access points commonly-detectable by two or more networked devices, access point protocols, and SSIDs, to name just a few non-limiting examples. Often, although not always, storage 1008 is a secondary storage medium (such as a hard disk) that is slower than primary storage (e.g., memory 1003). Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. In one example, a user of computer system 1000 may enter commands and/or other information into computer system 1000 via input device(s) 1033. Examples of an input device(s) 1033 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1033 may be used to accept or deny a communication prompting to a proximal networked device or to allow the initiation of a software application triggered by a proximity of another networked device. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, specifically networked devices, server systems, and access points connected to network 1030. Exemplary devices that may communicate via the network 1030 include, but are not limited to, server system 110, 218, 618, 818, the access point 106, WAPs 206, 208, 210, 212, 304, 306, 404, 406, 506, 508, 608, 610, 612, 614, 706, 708, 710, 712, 716, 806, 808, 810, 812, and the communication devices 102, 104, 202, 204, 302, 402, 502, 504, 602, 604, 606, 702, 704, 718, 802, 804 (via access points). Communications to and from computer system 1000 may be sent through network interface 1020 (e.g., network interfaces 226, 236). For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other networked devices) in the form of one or more packets in memory 1003 and communicated to network 1030 from network interface 1020. Processor(s) 1001 may access these communication packets stored in memory 1003 for processing. For instance, the proximity component 232 of the server system 218 may access the data store 234 in order to look for overlaps in access point identifiers received from the first and second communication devices 202, 204.

Examples of the network interface 1020 include, but are not limited to, a network interface card, a modem, and any combination thereof. Examples of a network 1030 (or network segment) include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1030, may employ a wired and/or a wireless mode of communication. In general, any network topology may be used.

Information and data can be displayed through a display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021. The display 1032 may be the display of one of the communication devices 102, 104, 202, 204, 302, 402, 502, 504, 602, 604, 606, 702, 704, 718, 802, 804. The display 1032 may render text or graphics indicating that proximal networked devices are detectable access points or display portions of applications that require or request proximity.

In addition to a display 1032, computer system 1000 may include one or more output devices 1034 including, but not limited to, an audio speaker, a printer, and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, firmware, or a combination of two or more of hardware, software, and firmware.

In one embodiment, the computer system 1000 can be a part of a server system (e.g., server system 110, 218, 618, 818). The processor 1001 can carry out identification of communication devices and other computing devices detecting or detectable by the same access points. Identifiers of computing devices detecting or detectable by the same access points can be stored in memory 1003. The identifiers can be passed to the identified networked devices and computing devices via the network interface 1020 and via the network 1030 such as the Internet or a cellular-based network. A processor 1001 within those networked devices and computing devices can then carry out an action based on knowledge of proximity as supplied by the server system.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or firmware depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, in firmware, or in a combination of two or more of these. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining proximity between first and second networked devices without the first and second networked devices sharing location information, the method comprising:
   receiving, at a server system, from the first and second networked devices, identifications of an access point that both the first and second networked devices detect;
   determining, at a proximity component of the server system, that each of the first and second networked devices are searching for and providing, respectively, a common software application, process, or service;
   then determining, at the proximity component of the server system that each of the first and second networked devices detect the access point; and
   transmitting to at least one of the first or second networked devices, at the server system, a proximity indicator indicating that the first and second networked devices are proximal.

2. The method of claim 1, wherein the second determining is a function of a number of access points detected by the first and second networked devices.

3. The method of claim 1, wherein the second determining takes into account a signal strength of the access point as measured by at least one of the first or second networked devices.

4. The method of claim 1, wherein the second determining uses knowledge of a location of the access point.

5. The method of claim 4, wherein the second determining uses knowledge of a maximum range of the access point.

6. The method of claim 1, further comprising assigning a weight to one or more access points and determining the proximity based on a weighted average of access points commonly detected by the first and second networked devices.

7. The method of claim 1, further comprising initiating a process on the first and second networked devices if the first and second networked devices are proximal.

8. A non-transitory, tangible computer readable storage medium, encoded with processor readable instructions to perform a method for determining proximity between at least first and second networked devices without knowledge of their location, the method comprising:
   receiving, at a server system, from the first and second networked devices, identifications of an access point that both the first and second networked devices detect;
   determining, at a proximity component of the server system, that each of the first and second networked devices detect the access point;
   accessing a location of the access point, where the location of the access point indicates that in order for the first and second devices to both detect the access point that the first and second devices are closer to each other than if the access point were in another location;
   based on the determining and the accessing, concluding that the first and second networked devices are close enough to be considered proximal; and
   transmitting to at least one of the first or second networked devices, a proximity indicator indicating that the first and second networked devices are proximal.

9. The non-transitory, tangible computer readable storage medium of claim, 8 further comprising initiating a process on one or both of the first and second networked devices if the first and second networked devices are proximal.

10. The non-transitory, tangible computer readable storage medium of claim 8, wherein the proximity component facilitates communication between the first and second networked devices if the first and second networked devices are proximal.

11. The non-transitory, tangible computer readable storage medium of claim 8, wherein the proximity component is further configured to determine if a common application, process, or service is running on both the first and second networked devices.

12. The non-transitory, tangible computer readable storage medium of claim, 8 wherein the access point is a WIFI access point.

13. The non-transitory, tangible computer readable storage medium of claim, 8 wherein the access point is a BLUETOOTH access point.

14. The non-transitory, tangible computer readable storage medium of claim, 8 wherein the access point is a cellular access point.

15. The non-transitory, tangible computer readable storage medium of claim, 8 wherein the access point is a default gateway.

16. The non-transitory, tangible computer readable storage medium of claim, 8 wherein the access point is a subnet.

17. The non-transitory, tangible computer readable storage medium of claim, 8 wherein the access point is a BLUETOOTH-enabled device.

18. A networked device comprising:
   a means for receiving from a first networked device identification of a first access point that the first networked device detects;
   a means for receiving from a second networked device identification of a second access point that the second networked device detects;
   a means for accessing a database of access point locations and determining that the first and second access point are within a same structure;
   a means for transmitting a proximity indicator to the first and second networked devices, where the proximity indicator includes data enabling the first and second networked devices to communicate with each other despite the fact that they do not both detect the same access point; and
   a means for initiating a network connection between the first and second networked devices using the proximity indicator.

19. A non-transitory, tangible computer readable storage medium, encoded with processor readable instructions to perform a method for determining proximity between at least first and second networked devices without knowledge of their location, the method comprising:
   receiving, at a server system, from the first and second networked devices, identifications of an access point that both the first and second networked devices detect;
   determining, at a proximity component of the server system, that each of the first and second networked devices detect the access point;
   receiving, at the server system, from the first networked device and from a third networked device, identifications of a second access point that both the first and the third networked devices detect;
   determining, at the proximity component of the server system, that each of the first and third networked devices detect the second access point;
   then determining, at the proximity component of the server system, based on the first and second determining, that the second and third networked devices are proximal; and
   transmitting to at least one of the first or second networked devices, at the server system, a proximity indicator indicating that the first and second networked devices are proximal.

20. The non-transitory, tangible computer readable storage medium of claim 19, wherein the process is a feature of a software program running on the first networked device.

21. The non-transitory, tangible computer readable storage medium of claim 19, further comprising determining if both the first and second networked devices have a common software application, process, or service that take proximity as an input argument.

22. The non-transitory, tangible computer readable storage medium of claim 19, wherein the process only initiates if at least one of the first and second networked devices has a software application, process, or service that takes proximity as an input argument.

* * * * *